United States Patent
Cao

(10) Patent No.: US 12,529,026 B1
(45) Date of Patent: Jan. 20, 2026

(54) *Aspergillus fumigatus* FOR DEGRADING SOIL MICROPLASTICS AND APPLICATION THEREOF

(71) Applicant: Inner Mongolia University of Technology, Hohhot (CN)

(72) Inventor: Yingnan Cao, Hohhot (CN)

(73) Assignee: Inner Mongolia University of Technology, Hohhot (CN)

( * ) Notice: Subject to any disclaimer, the term of this patent is extended or adjusted under 35 U.S.C. 154(b) by 0 days.

(21) Appl. No.: 19/207,422

(22) Filed: May 14, 2025

(30) Foreign Application Priority Data

Oct. 31, 2024 (CN) .......................... 202411534483.3

(51) Int. Cl.
- *C12N 1/14* (2006.01)
- *B09C 1/10* (2006.01)
- *C12R 1/68* (2006.01)

(52) U.S. Cl.
CPC ................ *C12N 1/14* (2013.01); *B09C 1/105* (2013.01); *C12R 2001/68* (2021.05)

(58) Field of Classification Search
CPC ........ C12N 1/14; B09C 1/105; C12R 2001/68
See application file for complete search history.

(56) References Cited

FOREIGN PATENT DOCUMENTS

| CN | 107090412 A | 8/2017 |
|---|---|---|
| CN | 112094758 A | 12/2020 |
| CN | 118389349 A | 7/2024 |
| WO | 2021205160 A1 | 10/2021 |

OTHER PUBLICATIONS

Williams, Janet Olufunmilayo, and Nosayame Thomas Osahon. 2021. "Assessment of Microplastic Degrading Potential of Fungal Isolates from an Estuary in Rivers State, Nigeria". South Asian Journal of Research in Microbiology 9 (2):11-19. doi.org/10.9734/sajrm/2021/v9i230204. (Year: 2021).*

O'Gorman CM, Fuller H, Dyer PS. Discovery of a sexual cycle in the opportunistic fungal pathogen Aspergillus fumigatus. Nature. Jan. 22, 2009;457(7228):471-4. doi: 10.1038/nature07528. PMID: 19043401. (Year: 2009).*

* cited by examiner

*Primary Examiner* — Kade Ariani
(74) *Attorney, Agent, or Firm* — Bayramoglu Law Offices LLC

(57) ABSTRACT

An *Aspergillus fumigatus* for degrading soil microplastics and an application thereof are provided. The *Aspergillus fumigatus* has a preservation name of *Aspergillus fumigatus* F and is deposited at the China General Microbiological Culture Collection Center on Sep. 18, 2024 under CGMCC NO. 41513. The *Aspergillus fumigatus* F may grow in an environment with PE and PET as the only carbon sources, and may be used as a biodegradable microbial inoculum applied to harmless treatment, recycling and environmental restoration of microplastic resources.

1 Claim, 5 Drawing Sheets

Specification includes a Sequence Listing.

Aspergillus fumigatus FOR DEGRADING SOIL MICROPLASTICS AND APPLICATION THEREOF

CROSS REFERENCE TO THE RELATED APPLICATIONS

This application is based upon and claims priority to Chinese Patent Application No. 202411534483.3, filed on Oct. 31, 2024, the entire contents of which are incorporated herein by reference.

SEQUENCE LISTING

The instant application contains a Sequence Listing which has been submitted in XML format via EFS-Web and is hereby incorporated by reference in its entirety. Said XML copy is named GBRZBC275_Sequence_Listing.xml, created on Apr. 2, 2025, and is 2,663 bytes in size.

TECHNICAL FIELD

The present invention relates to the technical field of microplastic management, and in particular, to an *Aspergillus fumigatus* for degrading soil microplastics and an application thereof.

BACKGROUND

Due to the excessive use of plastic products and the difficulty in recycling, most plastics enter the natural environment. The plastics are changed in physical and chemical properties under the combined action of biological and non-biological factors, and are broken into microplastics (MPs) with a particle size of less than 5 mm after subjected to physical, chemical and biological aging processes, which cause serious harm to the atmosphere, water bodies and soil. The soil environment is currently considered a primary sink for microplastics, and a microplastic content of the soil environment is 4 to 23 times that of the water environment. Among them, polyethylene (PE) and polyethylene terephthalate (PET) are two common microplastics in the soil, which have many harms to the soil. Not only do the two microplastics destroy the soil structure and affect soil organisms, but the harmful chemicals the two microplastics contain or adsorb, such as plasticizers and heavy metals, which may accumulate by the food chain and cause long-term negative impacts on soil organisms and the entire ecosystem. There are even reports that microplastics may enter the human body via the food chain, thereby inducing reactions such as inflammation, oxidative stress and tissue damage, causing intestinal barrier dysfunction and affecting the cardiovascular system. The removal of microplastics in the soil environment is therefore of critical importance.

At present, the degradation of microplastics mainly includes physical, chemical and biological degradation. Microbial degradation technology has attracted wide attention due to safety and environmental friendliness. The biodegradation of microplastics means that the microorganisms are adsorbed on the surface of microplastics, decomposed into small molecular substances that may be used by the microplastics through self-synthesis related enzymes and biological oxidation reaction, and finally converted into $CO_2$ and $H_2O$. At present, the research on the removal or restoration of microplastics is mainly focused on the water environment, which has the problems of low efficiency of microplastic degradation, difficulty in degrading multiple microplastics at the same time, incomplete degradation of microplastics, and difficulty in free microorganisms to adapt to complex environments and fail to play an effective role. The research on microbial degradation methods for microplastics in soil environments is still in its infancy. Therefore, the screening of core strains for microbial degradation and an immobilization application of the core strains are of great significance for degrading microplastic-contaminated soil.

SUMMARY

An object of the present invention is to provide an *Aspergillus fumigatus* for degrading soil microplastics and an application thereof, which may realize high-efficiency degradation of polyethylene, polyethylene terephthalate and other microplastics.

To achieve the above objective, the present invention provides the following technical solutions.

The present invention provides an *Aspergillus fumigatus* for degrading soil microplastics, wherein the *Aspergillus fumigatus* has a preservation name of *Aspergillus fumigatus* F and is deposited at the China General Microbiological Culture Collection Center on Sep. 18, 2024 under CGMCC NO. 41513.

The present invention further provides an application of the *Aspergillus fumigatus* in the degradation of microplastics.

Preferably, the microplastics are polyethylene (PE) and/or polyethylene terephthalate (PET).

The *Aspergillus fumigatus* F may grow in an environment with PE and PET as the only carbon sources. After two months of treatment under experimental conditions, the surface structures of the microplastics are damaged, the functional group structures of the microplastics are changed, the high molecular polymer undergoes the decomposition and fracture processes, and new compounds are formed in the processes. The degradation rates in the F-1 group (normal group) are 9.48% and 9.13%, the degradation rates in the F-2 group (high salt group) are 9.49% and 9.28%, and the degradation rates of the microplastics reach 8.15% and 8.26% within 50 days when the *Aspergillus fumigatus* F is applied to the in-situ biodegradation of soil microplastics. The *Aspergillus fumigatus* F may be used as a biodegradable microbial inoculum applied to harmless treatment, recycling and environmental restoration of microplastic resources.

PRESERVATION DESCRIPTION

An *Aspergillus fumigatus* has a preservation name of *Aspergillus fumigatus* F and is deposited at the China General Microbiological Culture Collection Center on Sep. 18, 2024 under CGMCC NO. 41513 with a deposition address of No. 3, Yard 1, Beichen West Road, Chaoyang District, Beijing, China.

BRIEF DESCRIPTION OF THE DRAWINGS

FIGS. 4A-4B show a morphology of *Aspergillus fumigatus* F, wherein FIG. 4A shows a colony morphology on a solid medium, and FIG. 4B shows a morphology of a single bacterium under a scanning electron microscope.

FIGS. 5A-5C show a physiological and biochemical experiment of *Aspergillus fumigatus* F, wherein FIG. 5A shows a carbon source utilization experiment, FIG. 5B shows a starch utilization experiment, and FIG. 5C shows a salt tolerance experiment.

FIGS. 8A-8B show a surface morphology change of microplastics after 60 days of degradation by *Aspergillus fumigatus* F, wherein FIG. 8A shows PET particles, and FIG. 8B shows PE film.

DETAILED DESCRIPTION OF THE EMBODIMENTS

Figure 1:
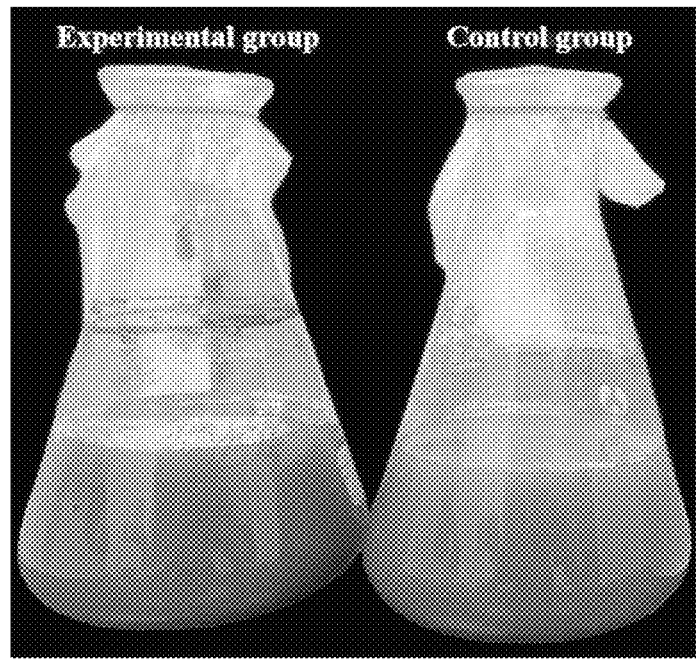
FIG. 1 is a graph showing the changes in a liquid microcarbon inorganic salt medium after 30 days of culture.

The present invention provides an *Aspergillus fumigatus* for degrading soil microplastics, wherein the *Aspergillus fumigatus* has a preservation name of *Aspergillus fumigatus* F and is deposited at the China General Microbiological Culture Collection Center on Sep. 18, 2024 under CGMCC NO. 41513.

The present invention further provides an application of the *Aspergillus fumigatus* in the degradation of microplastics.

In the present invention, the microplastics are polyethylene (PE) and/or polyethylene terephthalate (PET).

In the present invention, the strain *Aspergillus fumigatus* F has the following characteristics:
(1) This strain on a solid inorganic salt flat plate with microplastic as the only carbon source is grey velvet with neat edges and forms a bacterial colony with the thickness of 50 mm.
(2) Under a scanning electron microscope (2K times), a large number of conidiophores are found in the matrix, which are unbranched, colorless, non-septate, smooth, erect, and clustered. The conidiophores swell at the apex to form a vesicle, which is flask-shaped and has a diameter of 19 μm-22 μm.
(3) This strain may widely use glucose, sucrose, fructose, starch, and the like as carbon sources.
(4) This strain grew well in a solid inorganic salt medium with a salt concentration of 12%.
(5) The optimal growth temperature of this strain is 28-37° C.
(6) This strain may grow in an environment with PE or PET as the only carbon source. Within 60 days, the surface structures and the functional group structures of microplastics are damaged, the macromolecular polymers are depolymerized or broken, and new products are produced.

The technical solutions provided by the present invention will be described in detail below with reference to examples, which, however, should not be construed as limiting the scope of the present invention.

Example 1 Isolation and Screening of *Aspergillus fumigatus* F

A PE film with a diameter less than 5 mm and PET particles with a particle size of 0.75 μm were rinsed with deionized water to remove surface dust, added to a 2.5% SDS solution for ultrasonic treatment for 15 min, and then soaked in a low-concentration ethanol solution with a mass fraction of 75% and a high-concentration ethanol solution with a mass fraction of 95% for 3 h. After rinsed with sterile water 3 times on a clean bench to remove residual solvent, the PE film and the PET particles were dried and sterilized at 28° C. to obtain to-be-used microplastic, which was sterilized by ultraviolet irradiation for 3 h before use.

1 g of soil sample that has been contaminated by microplastics such as PE and PET for a long time was added to a sterile centrifuge tube together with 9 mL of normal saline. The sample was centrifuged at 3000 rpm for 5 min to remove soil particles and bulky substances. Then the supernatant was transferred to another sterile centrifuge tube and centrifuged at 8000 rpm for 15 min, and normal saline was added to prepare a soil bacterial suspension.

In a 50 mL liquid trace carbon source medium, 0.5 g of prepared PE and PET were added as carbon sources, and 1 mL of soil bacteria suspension was inoculated. The first enrichment culture was performed at 28° C. and 150 rpm to improve the survival rate of microorganisms. A liquid trace carbon source without microplastics was used as a control group.

The compositions of the liquid trace carbon source medium are as follows: 0.5 g of Yeast extract, 2.0 g of $NH_4SO_4$, 100 mL of trace element mother solution (1.0 g $FeSO_4 \cdot 7H_2O$, 1.0 g of $MgSO_4 \cdot 7H_2O$, 0.1 g of $CuSO_4 \cdot 5H_2O$, 0.1 g of $MnSO_4 \cdot H_2O$, 0.1 g of $ZnSO_4 \cdot 7H_2O$, making up a volume of 100 mL), 1000 mL water, pH 7, which were sterilized at 121° C. for 20 min.

After 30 days of enrichment culture, the medium changed from clear to turbid (FIG. 1). The inorganic salt liquid enrichment culture refers to taking 1 mL of the bacterial liquid that has been enriched and cultured for 30 days in the first trace carbon source liquid and adding the bacterial liquid to 100 mL of inorganic salt liquid medium, adding 0.5 g PE+0.5 g PET, and shaking for culture at 28° C. and 150 rpm for 90 days. Meanwhile, under the same conditions, an inorganic salt liquid medium without bacterial solution but with polyethylene was used as a blank control group.

Figure 2:
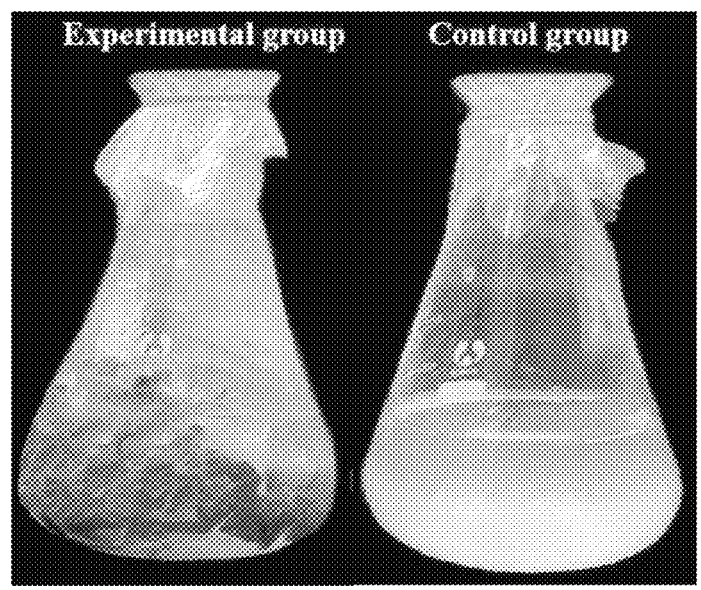
FIG. 2 is a graph showing the changes in a liquid inorganic salt medium after 90 days of culture.
Figure 3:
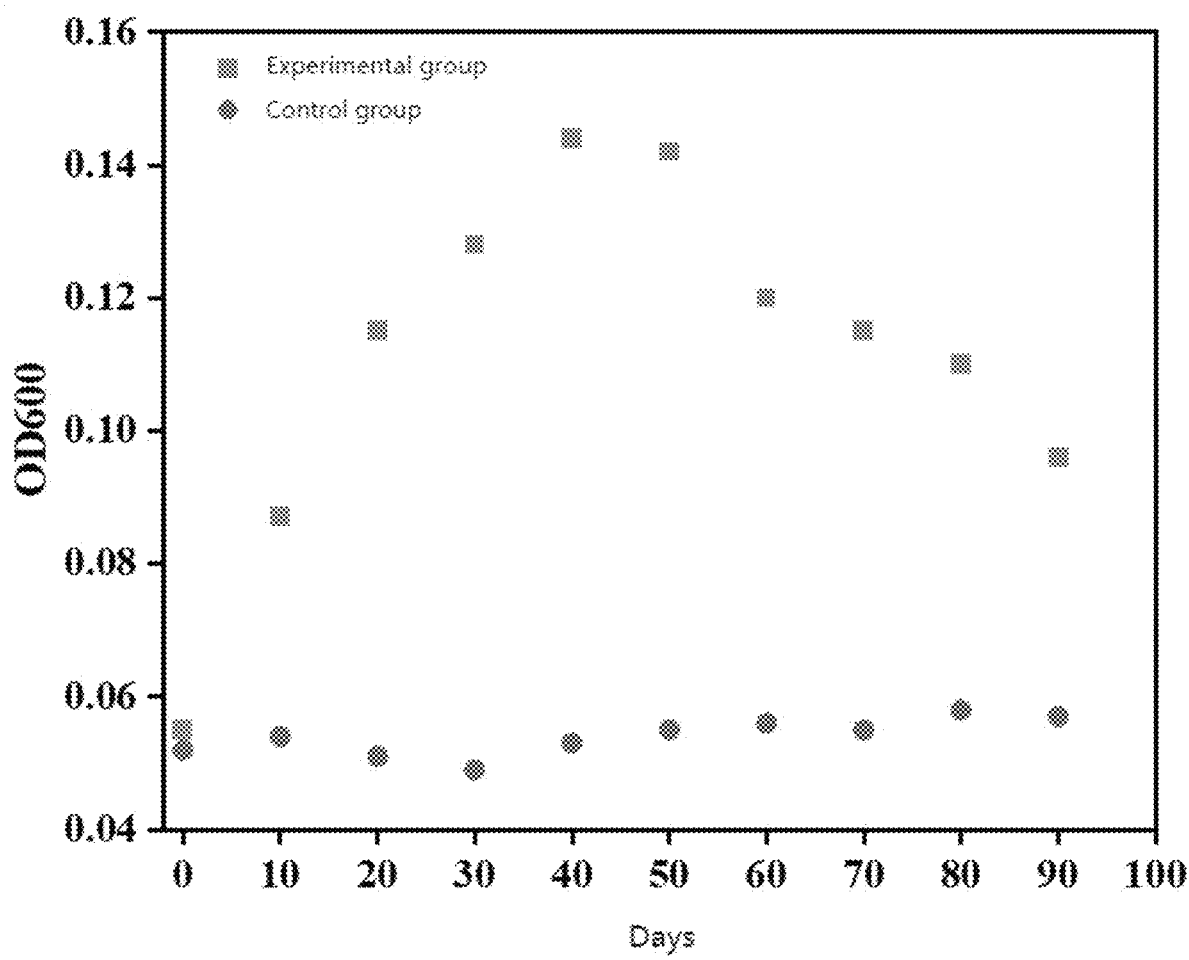
FIG. 3 is a graph showing the changes in absorbance of a liquid inorganic salt medium after 90 days of culture.

The change in turbidity of the liquid medium was observed and OD600 was measured. It was found that the liquid medium became turbid after 90 days and the degree of turbidity corresponded to the growth stage of the strain, and was most turbid in the logarithmic phase (as shown in FIGS. 2 and 3). 100 μL of bacterial solution was diluted to concentrations of $10^{-4}$, $10^{-5}$ and $10^{-6}$ in a gradient manner and then applied on a solid inorganic salt medium with PE and PET as carbon sources to isolate and purify bacteria that may degrade PE and PET.

The compositions of the inorganic salt medium are as follows: 0.70 g of $KH_2PO_4$, 0.70 g of $K_2HPO_4$, 0.70 g of $MgSO_4 \cdot 7H_2O$, 1.00 g of $NH_4NO_3$, 0.005 g of NaCl, 0.002 g of $FeSO_4 \cdot 7H_2O$, 0.002 g of $ZnSO_4 \cdot 7H_2O$ and 0.001 g of $MnSO_4 \cdot H_2O$, which were made up a volume of 1 L with the pH of 7 (20 g agar was added to the solid medium), and sterilized under high pressure at 120° C. for 20 min.

Example 2 Performance Determination and Identification of *Aspergillus fumigatus* F 1. The degrading bacteria F obtained by separation and screening were subjected to the following physiological and biochemical experiments:
   (1) The colony size, shape, color and other characteristics of the degrading bacteria F on the solid inorganic salt medium with PE and PET as carbon sources were observed;
   (2) After washed, fixed, rinsed, dehydrated, dried, and gold-plated, the degrading bacteria F were observed using a scanning electron microscope.

(3) The physiological and biochemical characteristics are explored through a carbon source utilization experiment, a starch utilization experiment and a salt tolerance experiment, wherein the carbon source utilization experiment used an inorganic salt medium inoculated with microorganisms but not added with three carbon sources as a control group, the starch utilization experiment used an agar medium for starch hydrolysis determination without iodine solution as a control group, and the salt tolerance experiment used an inorganic salt medium with the salt content of 0% as a control group.

Figure 4A:
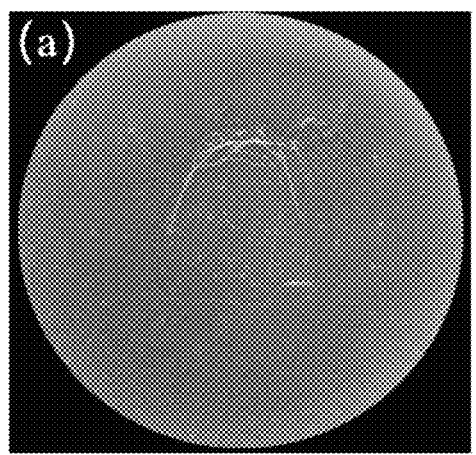
Figure 4B:
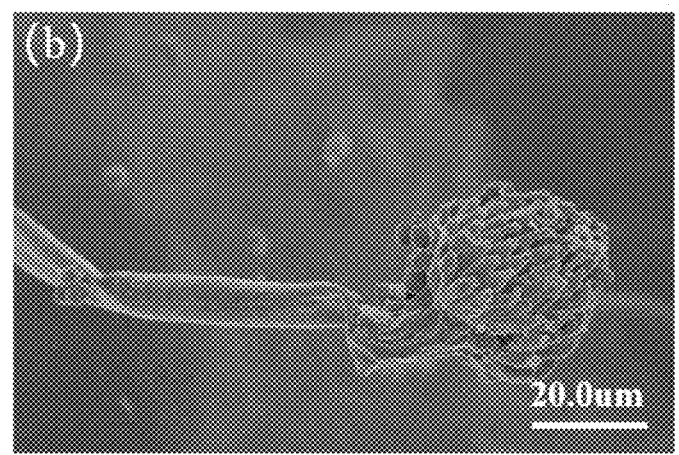
Figure 5A:
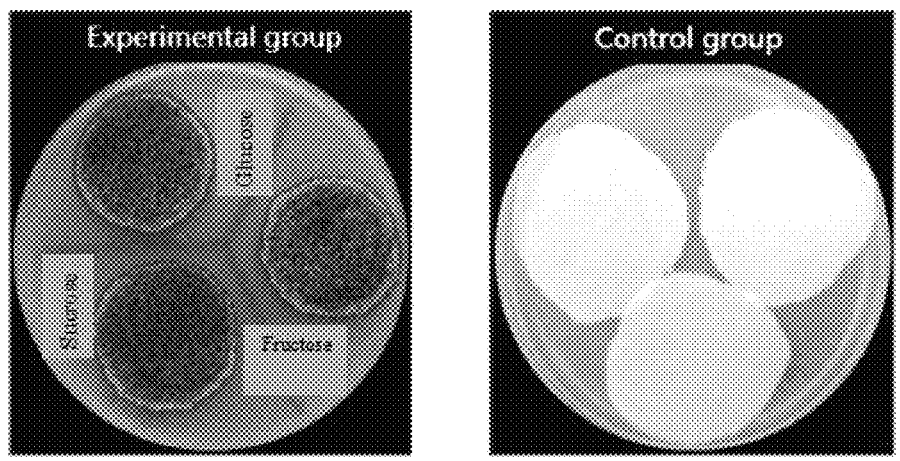
Figure 5B:
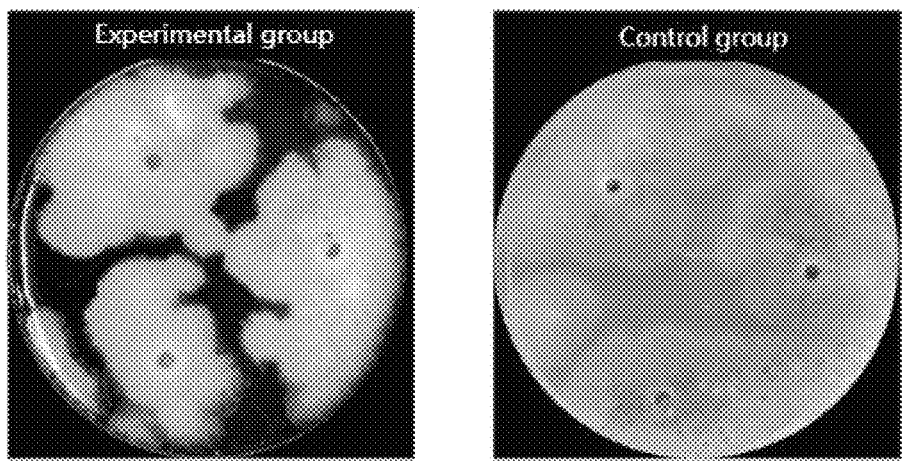
Figure 5C:
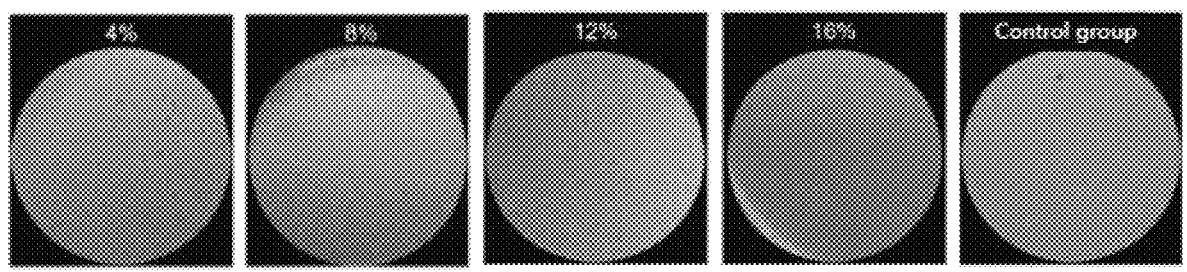

The results show that (1) the degrading bacteria F on a solid inorganic salt flat plate with microplastic as the only carbon source is grey velvet with neat edges and forms a bacterial colony with the thickness of 50 mm (the result is shown in FIG. 4A); (2) under a scanning electron microscope (2K times), a large number of conidiophores are found in the matrix, which are unbranched, colorless, non-septate, smooth, erect, and clustered, the conidiophores swell at the apex to form a vesicle, which is flask-shaped and has a diameter of 19 μm-22 μm, round, smooth surface, neat edges, and moist (the result is shown in FIG. 4B); and (3) the degrading bacteria F may widely utilize glucose, sucrose, fructose, starch, and the like as carbon sources and has a higher utilization rate of fructose, a transparent degradation ring with a diameter of 2 mm can be seen in a starch utilization experiment, and the growth condition of the degrading bacteria F in a solid inorganic salt medium with the salt concentration of 12% is good (as shown in FIGS. 5A-5C).

Specifically, the physiological and biochemical experiments are as follows:
(1) Carbon source utilization experiment: When the sterilized inorganic salt medium was cooled and became semi-solid, three sterilized circular filter papers with a diameter of 1 cm were quickly placed in the medium in the shape of a square grid and then allowed to stand until the medium was completely solidified. On the bottom of the petri dish, a marker pen was used to mark three grids corresponding to the papers and marked with corresponding numbers. The three carbon sources, glucose, fructose and sucrose, were sterilized under ultraviolet light for 4 h, and then prepared into solutions with a concentration of 10 g/L using sterile distilled water. Finally, the three solutions were dipped with a sterilized glass rod and coated on the corresponding filter papers. After standing for 30 min, the strains were inoculated on three filter papers respectively and cultured at a constant temperature of 28° C. for 7 days. The colony growth was observed.
(2) Starch hydrolysis experiment: The strain was inoculated on the medium by a spot planting method and cultured at a constant temperature of 28° C. After 4 days, the iodine solution was poured on the surface of the medium. If the iodine solution around the colony does not turn blue but forms a transparent circle, it means that the starch has been degraded, that is, amylase has been produced.
(3) Salt tolerance experiment: NaCl at concentrations of 0%, 4%, 8%, 12% and 16% was added to the inorganic salt medium. Different types of colonies on the solid medium were scraped into different centrifuge tubes containing 1 mL of sterile water using an inoculation loop to prepare a bacterial suspension. 100 μL of the suspension was inoculated into culture media with different salinities and cultured at a constant temperature of 28° C. The colony growth was observed.

The culture compositions involved in the physiological and biochemical experiment process are as follows:
(1) Inorganic salt medium (g·L$^{-1}$): 2.64 g of ammonium sulfate, 2.38 g of monopotassium phosphate, 5.65 g of dipotassium phosphate, 10 g of magnesium sulfate heptahydrate, 0.0064 g of copper sulfate pentahydrate, 0.0011 g of ferrous sulfate heptahydrate, 0.0079 g of manganese chloride tetrahydrate and 0.0015 g of zinc sulfate heptahydrate, wherein the volume was made up to 1 L, the pH value was adjusted to 6.9, 18 g of agar was added, and the mixture was sterilized for 20 min at 120° C. under high pressure.
(2) Starch hydrolysis determination agar medium (g·L$^{-1}$): 10.0 g of soluble starch, 1.0 g of potassium nitrate, 0.3 g of dipotassium hydrogen phosphate, 1.0 g of magnesium carbonate and 0.5 g of sodium chloride, wherein the volume was made up to 1 L, the pH value was adjusted to 7.3, 18 g of agar was added, and the mixture was sterilized for 20 min at 120° C. under high pressure.

2. The extraction, PCR amplification and sequencing of the F gene of the strain isolated and obtained above were completed by Shanghai Majorbio Bio-Pharm Technology Co., Ltd. Specific primers were used for PCR amplification:
16SrRNA-F: AGAGTTTGATCCTGGCTCAG (SEQ ID NO: 1);
16SrRNA-R: TACGGCTACCTTGTTACGACTT (SEQ ID NO: 2).

Figure 6:
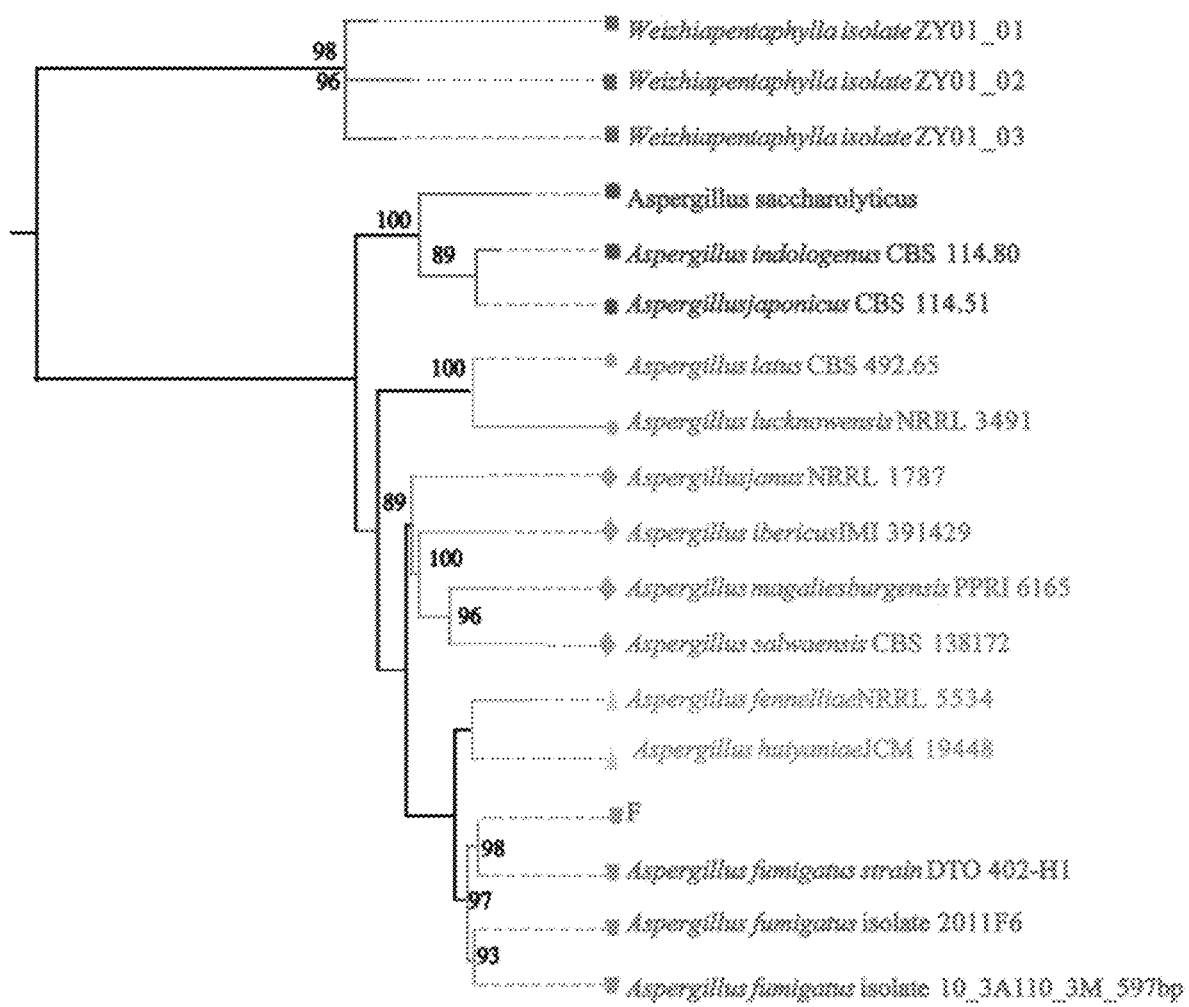
FIG. 6 shows a phylogenetic tree of *Aspergillus fumigatus* F.

The sequencing results were compared with the gene sequences in GenBank on the NCBI website using Blast to determine the species of the bacteria. MEGA5.0 (Molecular Evolutionary Genetics Analysis) was used to calculate genetic distances, neighbor-joining was used to construct phylogenetic trees, and bootstrap analysis was used to evaluate logarithmic stability. (FIG. 6).

The results of 16S rDNA sequence alignment showed that strain F naturally clustered with the 16S rDNA sequence of *Aspergillus fumigatus*, with a similarity of 98%, indicating that the genetic status of strain F and *Aspergillus fumigatus* is very close. Combined with physiological and biochemical characteristics, the strain F was identified as *Aspergillus fumigatus* and deposited at the General Microbiological Culture Collection Center of China General Microbiological Culture Collection Administration under CGMCC NO. 41513, with a deposit address at No. 3, Yard No. 1, Beichen West Road, Chaoyang District, Beijing, Institute of Microbiology, Chinese Academy of Sciences.

Example 3 Application of *Aspergillus fumigatus* F in the Degradation of Microplastics The *Aspergillus fumigatus* F screened and identified in Example 1 and Example 2 was used for microplastic biodegradation. Since *Aspergillus fumigatus* F was screened from a high-salt environment and has high salt tolerance, a microplastic-liquid inorganic salt medium (hereinafter referred to as F-1) and a microplastic-high salt (12%) liquid inorganic salt medium (hereinafter referred to as F-2) were set up respectively to analyze the microplastic degradation efficiency under different salinity conditions.

The specific degradation steps are as follows:
The compositions of microplastic-liquid inorganic salt medium are as follows: inorganic salt medium+0.5 mm PE film+0.75 μm PET particles; the specific compositions are as follows: 0.70 g of $KH_2PO_4$, 0.70 g of $K_2HPO_4$, 0.70 g of $MgSO_4·7H_2O$, 1.00 g of $NH_4NO_3$, 0.005 g of NaCl, 0.002 g of FeSO$_4$·7H$_2$O, 0.002 g of ZnSO$_4$·7H$_2$O and 0.001 g of MnSO$_4$·H$_2$O, 2 g of PE film, and 2 g PET particles.

The compositions of microplastic-high salt (12%) liquid inorganic salt medium are as follows: inorganic salt medium+0.5 mm PE film+0.75 μm PET particles+NaCl (with a final concentration of 12%); the specific compositions are as follows: 0.70 g of KH$_2$PO$_4$, 0.70 g of K$_2$HPO$_4$, 0.70 g of MgSO$_4$·7H$_2$O, 1.00 g of NH$_4$NO$_3$, 0.005 g of NaCl, 0.002 g of FeSO$_4$·7H$_2$O, 0.002 g of ZnSO$_4$·7H$_2$O and 0.001 g of MnSO$_4$·H$_2$O, 2 g of PE film, 2 g PET particles, and 120 g of NaCl.

- F-1: 1 mL of *Aspergillus fumigatus* F obtained by screening in Example 1 was made into a PBS bacterial suspension with an OD600 of 0.9, and inoculated into a conical flask containing 50 mL of microplastic-liquid inorganic salt medium at a volume ratio of 1:10.
- F-2: 1 mL of *Aspergillus fumigatus* F obtained by screening in Example 1 was made into a PBS bacterial suspension with an OD600 of 0.9, and inoculated into a conical flask containing 50 mL of microplastic-high salt (12%)-liquid inorganic salt medium at a volume ratio of 1:10.
- Control group: Liquid inorganic salt medium without inoculation of microorganisms was used as a control group.

Figure 7:
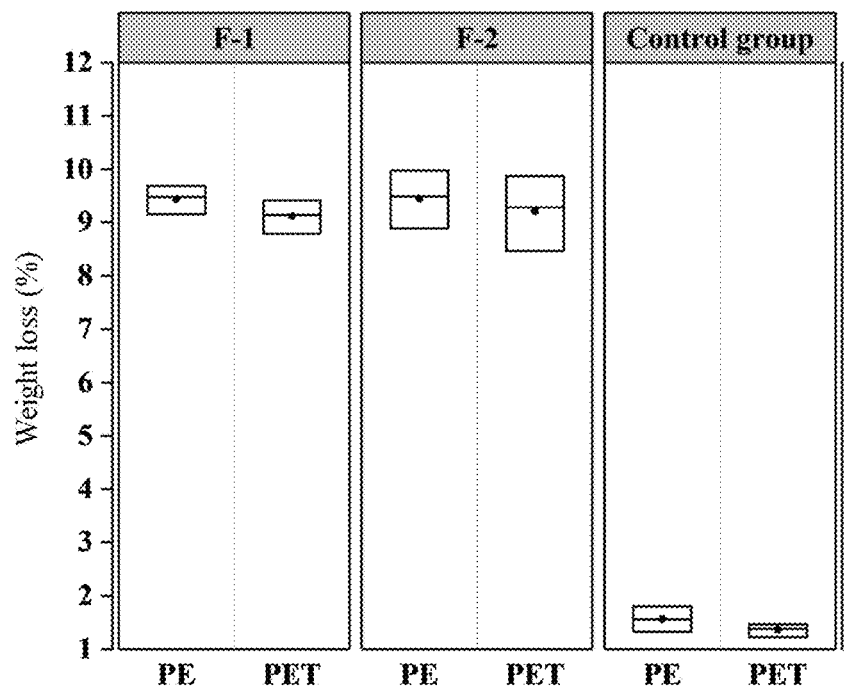
FIG. 7 shows a weight loss of microplastics after 60 days of degradation by *Aspergillus fumigatus* F.

The above groups were cultured at 28° C. and 150 rpm in the dark. After 60 days of culture, the microplastic particles degraded by strain F were separated from the medium by filtration, the particles were washed with 75% ethanol to remove the microorganisms attached to the microplastic particles, and then dried. The dried microplastics were weighed with an analytical balance, and the weight loss rate of the microplastics after degradation by the degrading strain F was calculated. The lost weight was the degradation rate of the microplastic degradation strain F. In addition, a scanning electron microscope was used to observe the microscopic features of the surface of the microplastic particles before and after degradation, and to observe whether pits, wrinkles and other features appeared on the surface of the microplastics; and the changes in functional groups before and after degradation were analyzed by Fourier transform infrared spectrometer. The results showed that:

(1) As shown in FIG. 7, after 60 days of microplastic treatment, the PE film and PET particles degraded by *Aspergillus fumigatus* F were recovered by screening, washed, dried and weighed. Formula 1 showed that compared with the blank control group (inorganic salt medium without inoculation of bacterial solution but containing microplastics), the degradation rate of the inorganic salt microplastic medium inoculated with strain F was significantly higher than that of the control group after 60 days of culture under the same conditions. The degradation rates of PE film and PET particles in F-1 after 60 days were 9.48% and 9.13%, respectively. The degradation rates of PE film and PET particles in F-2 after 60 days were 9.49% and 9.28%, respectively. Compared with the F-1 group, the degradation rates of PE film and PET particles in the high-salt condition (F-2 group) were increased.

Figure 8A:
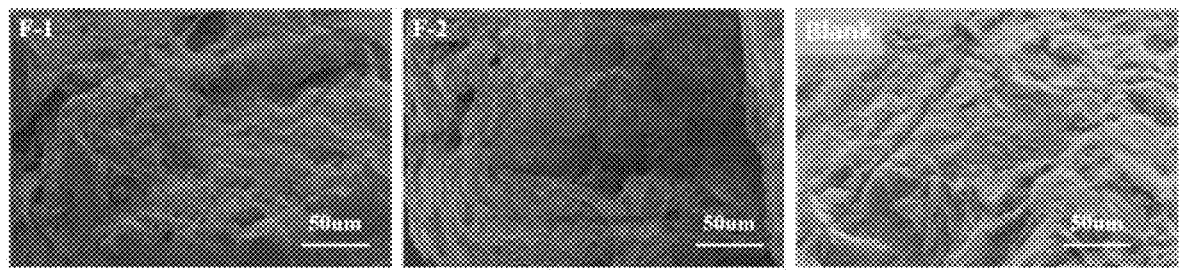
Figure 8B:
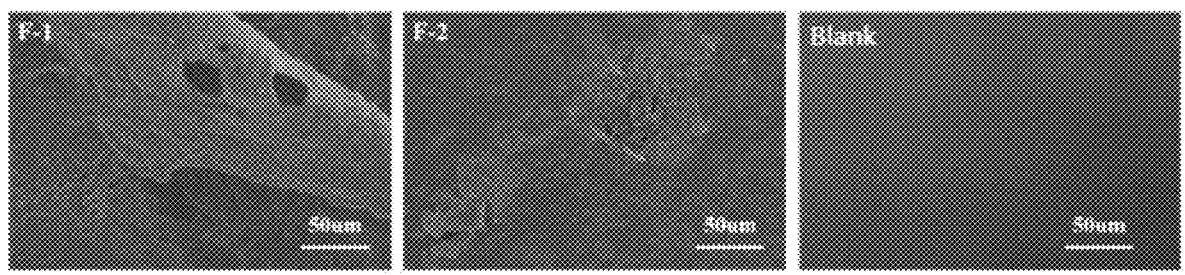

Microplastic weight loss rate (%)=[(original mass of microplastics−mass of microplastics after degradation)/original mass of microplastics]×100%;     Formula 1:

(2) As shown in FIGS. 8A-8B, the surface of PE and PET microplastics before degradation was relatively flat and smooth. After inoculation with *Aspergillus fumigatus* F, the surface of the film and particles became rougher and uneven in some areas, with obvious gullies, grooves, pits and wrinkles. The degree of damage was significantly greater than that of the microplastics before degradation.

It can be seen from the above examples that the present invention provides an *Aspergillus fumigatus* for degrading soil microplastics and an application thereof, wherein the *Aspergillus fumigatus* has a preservation name of *Aspergillus fumigatus* F and is deposited at the China General Microbiological Culture Collection Center on Sep. 18, 2024 under CGMCC NO. 41513. The *Aspergillus fumigatus* F may grow in an environment with PE and PET as the only carbon sources, and may be used as a biodegradable microbial inoculum applied to harmless treatment, recycling and environmental restoration of microplastic resources.

The above descriptions are only preferred embodiments of the present invention. It should be noted that those of ordinary skill in the art can also make several improvements and modifications without departing from the principle of the present invention, and such improvements and modifications shall fall within the protection scope of the present invention.

What is claimed is:

1. A method of degrading microplastics in soil, comprising contacting soil comprising polyethylene and polyethylene terephthalate microplastics with an aqueous phosphate-buffered saline (PBS) suspension of an *Aspergillus fumigatus* strain designated *Aspergillus fumigatus* F, deposited at the China General Microbiological Culture Collection Center (CGMCC) on Sep. 18, 2024 under CGMCC No. 41513, wherein the polyethylene and polyethylene terephthalate microplastics exhibit more than 9% weight loss in less than 60 days.

* * * * *

SEQUENCE LISTING

```
Sequence total quantity: 2
SEQ ID NO: 1           moltype = DNA  length = 20
FEATURE                Location/Qualifiers
source                 1..20
                       mol_type = other DNA
                       organism = synthetic construct
SEQUENCE: 1
agagtttgat cctggctcag                                              20

SEQ ID NO: 2           moltype = DNA  length = 22
FEATURE                Location/Qualifiers
source                 1..22
                       mol_type = other DNA
                       organism = synthetic construct
SEQUENCE: 2
tacggctacc ttgttacgac tt                                           22
```